United States Patent
Cantrell et al.

(10) Patent No.: US 10,567,917 B2
(45) Date of Patent: Feb. 18, 2020

(54) SYSTEM AND METHOD FOR INDICATING DRONES FLYING OVERHEAD

(71) Applicant: Walmart Apollo, LLC, Bentonville, AR (US)

(72) Inventors: Robert Cantrell, Herndon, VA (US); John J. O'Brien, Farmington, AR (US); Brian McHale, Oldham (GB)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/284,385

(22) Filed: Feb. 25, 2019

(65) Prior Publication Data

US 2019/0268720 A1    Aug. 29, 2019

Related U.S. Application Data

(60) Provisional application No. 62/636,793, filed on Feb. 28, 2018.

(51) Int. Cl.
| | | |
|---|---|---|
| *H04W 4/024* | (2018.01) | |
| *G08B 7/06* | (2006.01) | |
| *H04W 4/029* | (2018.01) | |

(52) U.S. Cl.
CPC .............. *H04W 4/024* (2018.02); *G08B 7/06* (2013.01); *H04W 4/029* (2018.02)

(58) Field of Classification Search
CPC ......... H04W 4/024; H04W 4/029; G08B 7/06
USPC .................... 455/456.6, 456.1, 456.2, 404.2
See application file for complete search history.

(56) References Cited

U.S. PATENT DOCUMENTS

| | | | |
|---|---|---|---|
| 8,543,265 B2 | 9/2013 | Ekhaguere et al. | |
| 8,788,121 B2 | 7/2014 | Klinger | |
| 9,318,014 B1 | 4/2016 | Cheatham, III et al. | |
| 9,563,200 B2 | 2/2017 | Rischmuller et al. | |

(Continued)

FOREIGN PATENT DOCUMENTS

| | | |
|---|---|---|
| CN | 106292708 A | 1/2017 |
| CN | 107643533 A | 1/2018 |
| KR | 20160125215 A | 10/2016 |

OTHER PUBLICATIONS

"Drone Watcher APP", Drone Watcher, 2017, pp. 1-3.
(Continued)

*Primary Examiner* — Congvan Tran
(74) *Attorney, Agent, or Firm* — Venable LLP; Jeffri A. Kaminski

(57) ABSTRACT

A system and method for tracking and alerting a drone flying overhead are provided herein. The method includes acquiring a first data associated with a user device position; detecting a path corresponding to movement of the user device; receiving, from a server at the user device, drone data associated with a plurality of drones; filtering the drone data to obtain a second data associated with a drone position and a respective drone route which intersects with the path; predicting an intersection area; determining a distance between the user device position and the drone position based on the first data and the second data; determining whether a determined distance is equal to or less than a preset distance; and instructing a user to change the path or the speed of travel down a path when the determined distance is equal to or less than the preset distance.

16 Claims, 7 Drawing Sheets

(56) References Cited

U.S. PATENT DOCUMENTS

| | | | |
|---|---|---|---|
| 9,573,684 B2 | 2/2017 | Kimchi et al. | |
| 9,747,901 B1 | 8/2017 | Gentry | |
| 2016/0023762 A1 | 1/2016 | Wang | |
| 2017/0162063 A1* | 6/2017 | Kuhara | B64C 13/18 |
| 2017/0220978 A1* | 8/2017 | Vaananen | G06Q 10/083 |
| 2017/0372612 A1 | 12/2017 | Bai et al. | |
| 2018/0029706 A1 | 2/2018 | Baruch | |
| 2018/0046201 A1* | 2/2018 | Erickson | G05D 1/101 |
| 2018/0290731 A1* | 10/2018 | Ishibashi | B64C 39/024 |
| 2018/0357909 A1* | 12/2018 | Eyhorn | B64C 39/024 |
| 2019/0094863 A1* | 3/2019 | Silva | G05D 1/0202 |
| 2019/0104496 A1* | 4/2019 | Sogo | H04B 17/318 |

OTHER PUBLICATIONS

International Search Report and Written Opinion dated Jun. 21, 2019, issued in corresponding PCT Application No. PCT/US2019/019435.

\* cited by examiner

SYSTEM AND METHOD FOR INDICATING DRONES FLYING OVERHEAD

CROSS-REFERENCE TO RELATED APPLICATIONS

This present Patent Application claims priority benefit from U.S. Provisional Patent Application No. 62/636,793 filed on Feb. 28, 2018, the entire content of which is hereby incorporated herein by reference.

TECHNICAL FIELD

The present disclosure relates to a drone overhead indicator, and more specifically to a system and method for tracking and alerting for a drone flying overhead.

BACKGROUND

Autonomous vehicles including aerial vehicles such as unmanned aerial vehicles (UAVs) (e.g., drones) can be used in package deliveries, farmland surveys, search and rescue operations, railway inspections, and surveillance operations, etc. Commercial drones may be exceptionally safe and be legal to fly over populated areas. However, people may not like having drones fly over them without first being notified or alerted. People may be concerned about safety and security of the drones because of a fear of drones falling or crashes.

There is a need for a system to provide information related to drones flying nearby.

SUMMARY

An example computer-implemented method implemented on a user device comprising at least one processor and at least one memory for performing concepts disclosed herein can include: acquiring a first data associated with a position of the user device, the first data comprising a first latitude and a first longitude and being updated based on movement of the user device; detecting a path corresponding to the movement of the user device; receiving, from a server at the user device, drone data associated with a plurality of drones in an area where the user device is located; filtering the drone data to obtain a second data associated with a position of a drone and a respective drone route which intersects with the path, the second data of the drone comprising a second latitude and a second longitude and being updated based on movement of the drone; predicting an intersection area where the drone route intersects with the path, the intersection area having a center indicative of the position of the drone on a display screen of the user device and a circular area with a radius indicative of a preset distance between the drone and the user device; determining a distance between the position of the user device and the position of the drone based on the first data and the second data; determining whether a determined distance is equal to or less than a preset distance; and instructing, via a display screen of the user device, the user to change the path or the speed of travel down a path for preventing the user from traveling beneath the drone flying overhead when the determined distance is equal to or less than the preset distance.

An example system configured according to the concepts and principles disclosed herein can include: a server in communication with a plurality of drones; a user device carried by a user and comprising at least one processor and a non-transitory computer-readable storage medium; and a non-transitory computer program product containing executable instructions, the non-transitory computer-readable storage medium having the instructions stored which, when executed by the processor, cause the processor to perform operations comprising: acquiring a first data associated with a position of the user device, the first data comprising a first latitude and a first longitude and being updated based on movement of the user device; detecting a path corresponding to the movement of the user device; receiving, from the server at the user device, drone data associated with a plurality of drones in an area where the user device is located; filtering the drone data to obtain a second data associated with a position of a drone and a respective drone route which intersects with the path, the second data of the drone comprising a second latitude and a second longitude and being updated based on movement of the drone; predicting an intersection area where the drone route intersects with the path, the intersection area having a center indicative of the position of the drone on a display screen of the user device and a circular area with a radius indicative of a preset distance between the drone and the user device; determining a distance between the position of the user device and the position of the drone based on the first data and the second data; determining whether a determined distance is equal to or less than a preset distance; and instructing, via a display screen of the user device, the user to change the path or the speed of travel down a path for preventing the user from traveling beneath the drone flying overhead when the determined distance is equal to or less than the preset distance.

An example non-transitory computer-readable storage medium configured as disclosed herein can have instructions stored which, when executed by a computing device, cause the computing device to perform operations including: acquiring a first data associated with a position of the user device, the first data comprising a first latitude and a first longitude and being updated based on movement of the user device; detecting a path corresponding to the movement of the user device; receiving, from a server at the user device, drone data associated with a plurality of drones in an area where the user device is located; filtering the drone data to obtain a second data associated with a position of a drone and a respective drone route which intersects with the path, the second data of the drone comprising a second latitude and a second longitude and being updated based on movement of the drone; predicting an intersection area where the drone route intersects with the path, the intersection area having a center indicative of the position of the drone on a display screen of the user device and a circular area with a radius indicative of a preset distance between the drone and the user device; determining a distance between the position of the user device and the position of the drone based on the first data and the second data; determining whether a determined distance is equal to or less than a preset distance; and instructing, via a display screen of the user device, the user to change the path or the speed of travel down a path for preventing the user from traveling beneath the drone flying overhead when the determined distance is equal to or less than the preset distance.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Example embodiments of this disclosure are illustrated by way of an example and not limited in the figures of the accompanying drawings, in which like references indicate similar elements and in which.

Figure 1:
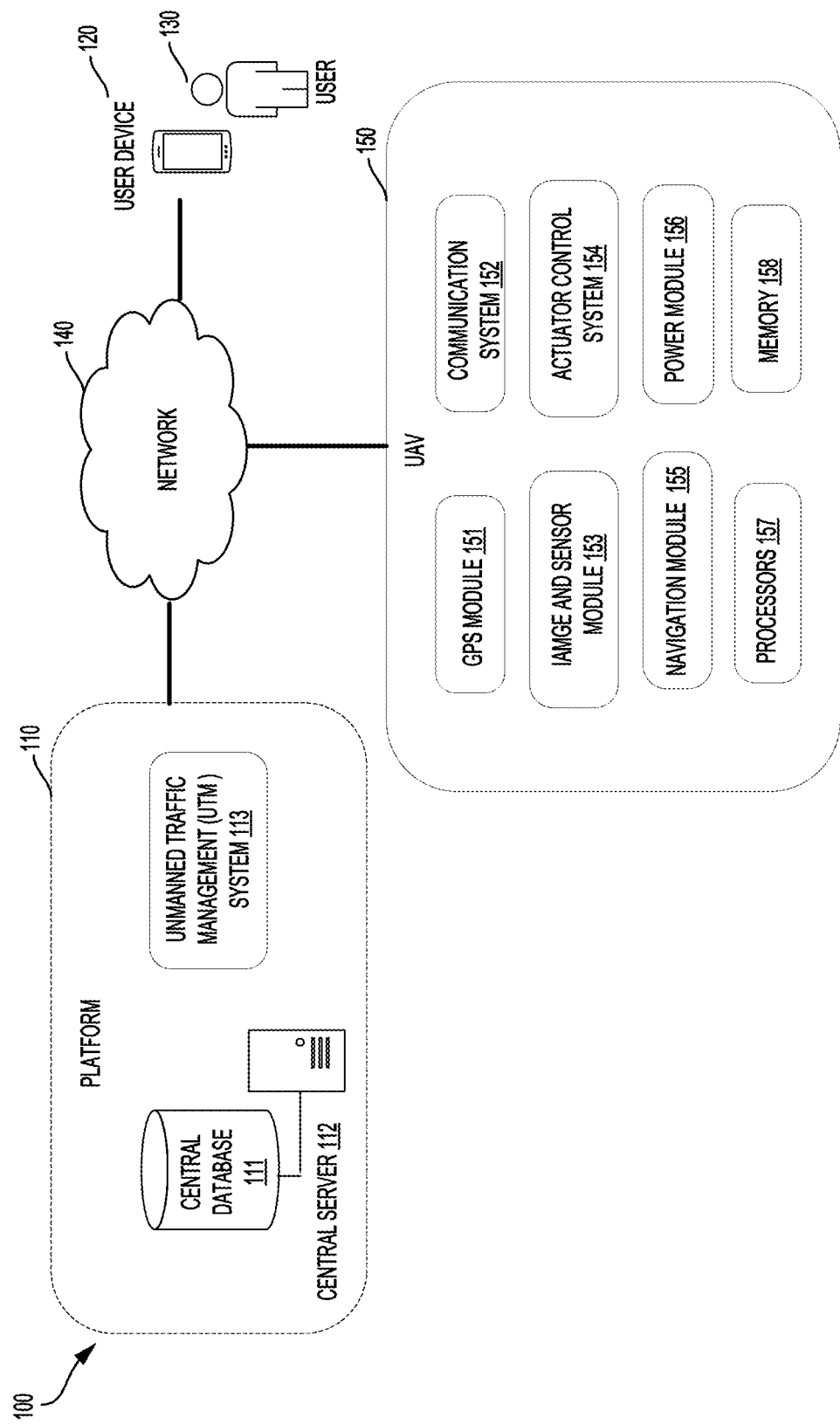
FIG. 1 is a block diagram illustrating an example environment in which some example embodiments may be implemented.

It is to be understood that both the foregoing general description and the following detailed description are example and explanatory and are intended to provide further explanations of the invention as claimed only and are, therefore, not intended to necessarily limit the scope of the disclosure.

DETAILED DESCRIPTION

Various example embodiments of the present disclosure will be described in detail below with reference to the accompanying drawings. Throughout the specification, like reference numerals denote like elements having the same or similar functions. While specific implementations and example embodiments are described, it should be understood that this is done for illustration purposes only. Other components and configurations may be used without parting from the spirit and scope of the disclosure, and can be implemented in combinations of the variations provided. These variations shall be described herein as the various embodiments are set forth.

The concepts disclosed herein are directed to utilizing drone position tracking information to provide an alert, for example, to a mobile device, when a drone may be approaching. An application implemented on the mobile device may inform a user of the approach of a drone. The application may provide instructions to avoid the drone.

Embodiments of the invention may combine a mobile device with information regarding a UAV location from an Unmanned Traffic Management (UTM) system, Global Positioning System (GPS) trackers, etc. The information may be obtained from the Federal Aviation Administration (FAA) or a commercial operation, or an entity performing air traffic control operations. Other tracking technology, such as beacon and transponder, may be configured on the drone or in the system to detect drones and drone locations and to provide an alert within a few seconds when a drone is nearby. The UTM system may collect drone data associated with all the drones flying in an area and send the drone data to a device. The system may create a data set that predicts UAV or drone position, and predict when a drone path and a user path intersects, for example in a plot of x and y axes. A predictive visual zone or area in front of the drone may be indicated on the user device.

In some example embodiments, an application with encoded instructions may be implemented on the user mobile devices for indicating and avoiding drone overhead. The application may receive information about the drone locations, determine which drones are nearby, and provide an alert. The application can provide an easier way for the users to avoid finding themselves near a drone.

FIG. 1 is a block diagram illustrating an example environment 100 in which some example embodiments may be implemented. The example environment 100 generally includes one or more of platform 110, user device 120, user 130, network 140, and a plurality of drones 150.

The platform 110 may be a network-accessible computing platform to control and manage the drone flights via a UTM system 113. The platform 110 may be implemented as a computing infrastructure of one or more servers and databases including processors, memory (data storage), software, data access interface, and other components that are accessible via various type of wireless or wired networks. One or more servers are shown and referred to as central server 112 for simplicity, and one or more databases are shown and referred to as a central database 111 herein for simplicity. These servers may include one or more processors and memory which may be utilized to operate the UTM system 113.

In some example embodiments, the UTM system 113 may be in communication with UAVs, UAV local ground stations or drone distribution centers (not shown) for drone traffic control. The UTM system 113 may process requests for drone deliveries, generate and provide flight route instructions for the drones, and access a map database on the platform to coordinate safe drone traffic in the airspace in an area. The UTM system 113 may observe the flying trajectory of the drone and process the drone route information for determining and communicating real-time airspace status with a drone. The drone route information may include a variety of drone operational parameters and be updated based on movement of the drone.

The user device 120 may be a mobile device carried by the user to receive a status of a requested drone delivery, a status of a flying drone nearby, and alerts when a drone is flying overhead or is in the vicinity of the user.

A drone 150 may include GPS module 151, communication system 152, image and sensor module 153, actuator control system 154, navigation module 155, power module 156, processors 157 and memory (data storage) 158, and other mechanical components. The communication system 152 may allow the drones to communicate with computing devices or processors in the environment 100 for delivering packages. The communication system 152 may utilize cellular, radio frequency, near field communication, infrared, Bluetooth, Wi-Fi, satellite, or any other means for communication. The image and sensor module 153 of the drone may include one or more visual sensors, proximity sensors, and other types of sensors. These sensors may be placed on one or more surfaces of the drones. The drones may also include GPS module 151, navigation module 155 and one or more processors 157, which may determine positioning information for drones, guide drone navigating to the destination and conduct specific functions or data analysis. In some example embodiments, the operational parameters of the drone may comprise GPS information, flight heights, flight speeds, flight route, package weight, package capacity, battery information, direction, air speed, etc.

In the example environment 100, network 140 may include satellite-based navigation system or a terrestrial wireless network, Wi-Fi, and other type of wired or wireless networks to facilitate communications between the various networks devices associated with example environment 100.

User 130 may create, via central server 112 and network, an account with platform 110. The user may also create a user profile to store detailed user information in central database 111 for requesting a drone delivery service. Each account profile may be configured to store data related to an existing user including user's username, email address, password, phone number, user's rating, drone delivery information, delivery (residential) address, payment transaction accounts, purchasing preference, search history, order history, information, other relevant demographic or analytical data, third parties including family members, friends, or neighbors, etc. The drone delivery information may include drone delivery destination, nearby pickup site information, delivery preference, drone delivery pickup timeslots, and other type of information related to drone delivery.

Figure 2:
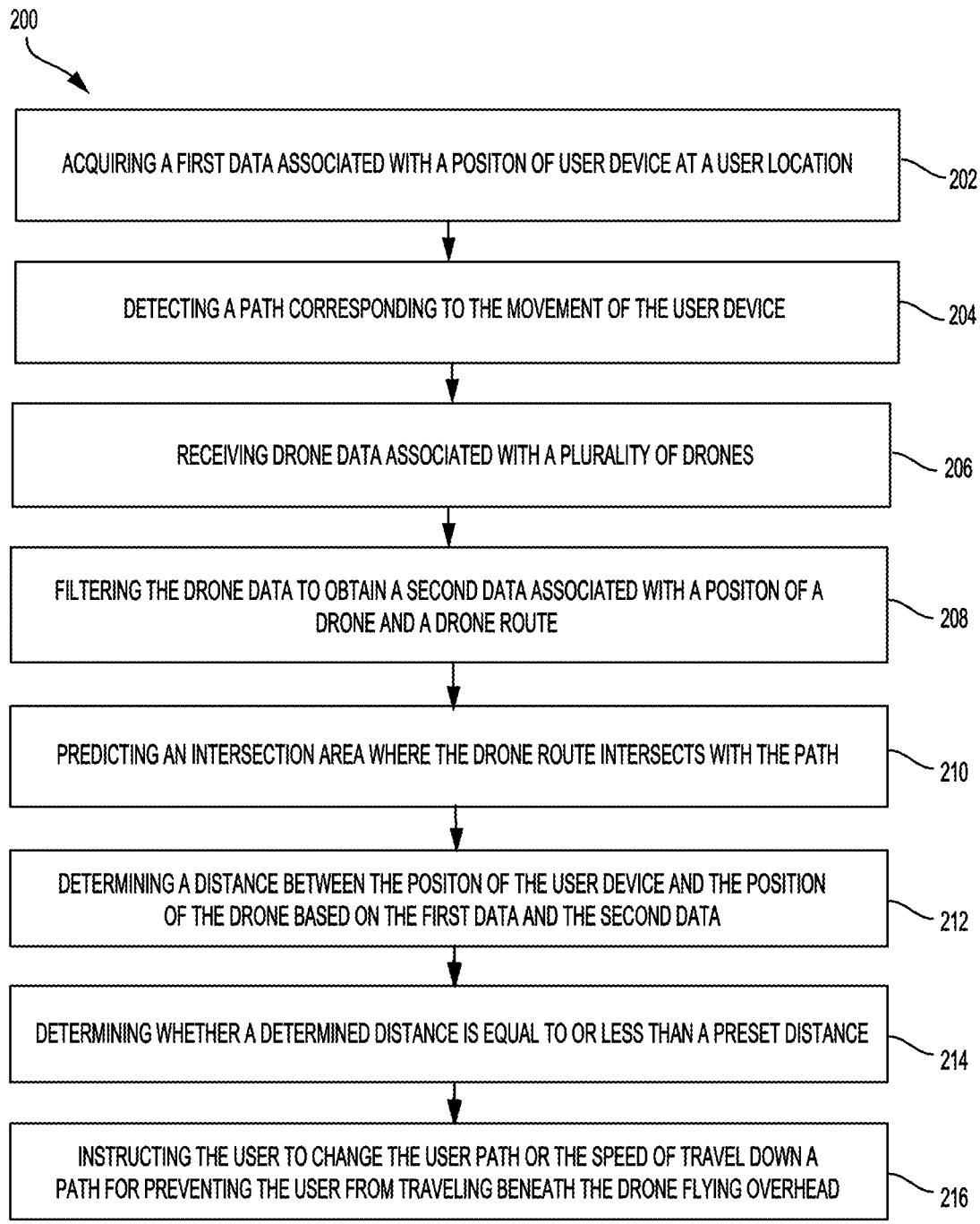
FIG. 2 is a flowchart diagram illustrating a method for detecting and alerting for a drone flying overhead in accordance with some example embodiments.

FIG. 2 is a flowchart diagram illustrating an example process 200 for detecting a drone, providing an alert and instruction on how to avoid the drone. The process 200 may be implemented in the above described systems and may include the following steps. The data may be processed in real-time in the following steps. Steps may be reordered, omitted or combined depending on the operations being performed.

In step 202, a first data associated with a position of the user device may be acquired by the user device. The position of the user device may be entered by the user with a physical address associated with map data. The position of the user device may also be detected by sensors or GPS receiver embedded in the user device or provided by various navigation and mapping applications. The first data may include a set of GPS coordinates including latitude and longitude along with an altitude associated with the position of the user device. The first data associated with the position of the user device may be updated at a consistent rate or period based on movement of the user device. In some example embodiments, the first data associated with the user location may be mapped and displayed on an electronic map of a graphic user interface or a display screen of the user device.

In step 204, a user path may be detected corresponding to the movement of the user device. The user may move or travel with a speed and direction on an ongoing basis. In some example embodiments, the system or application may detect the user's travelling speed and user's travelling direction based on an update of the first data associated with the movement of the user device. The user path may be detected based on the user location, the user's travelling speed, and the user's travelling direction. The detected user path may be mapped and displayed on an electronic map of the display screen of the user device.

In step 206, the user device may receive drone data associated with a plurality of drones in an area where the user is located. For example, the server may be utilized to operate the UTM system or other traffic management system for tracking drones in an area. The UTM system may generate the drone data. The drone data may be provided to the user device via an application.

In step 208, the received drone data may be filtered by the processor of the user device via an application to obtain a second data associated with a position of a drone and a respective drone route. The second data may include a set of GPS coordinates including a latitude and a longitude along with an altitude associated with the position of the drone. The second data may be updated based on movement of the drone. The second data and the drone route may be mapped and shown on the display screen of the user device via an application implemented on the user device. This may be done for drones within a preset distance of the user device.

Figure 3:
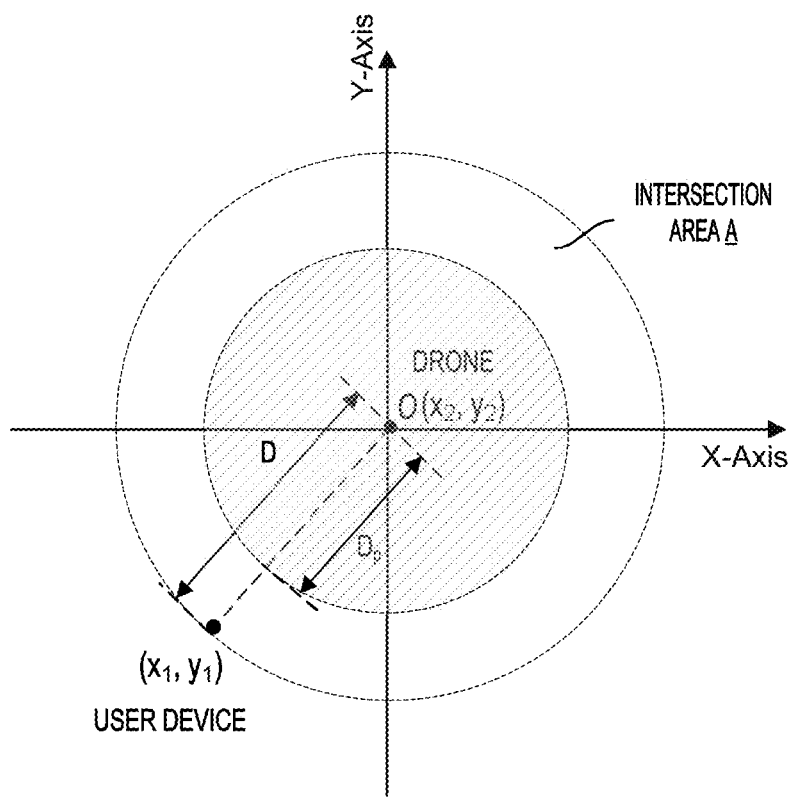
FIG. 3 is a diagram illustrating an example for mapping a drone position and a user position on an x-y plot in accordance with some example embodiments.

In step 210, an intersection area A may be predicted and displayed on the map on the display screen of the user device. FIG. 3 is a diagram illustrating an example for mapping a drone position and a user position with an intersection area on an x-y plot in accordance with example embodiments. As shown in FIG. 3, the intersection area A may include a circular area where the drone route intersects with the user path. The intersection area A may include a center O indicative of the position of the drone. In one embodiment, the center O of a circular area may be indicated as a position of the user device. The circular area may have a radius with a preset distance $D_p$ between the drone and the user device from the center O to the circumference of the circular area. Referring to FIG. 3, a set of GPS coordinates of (x1, y1) of a position of the user, a set of GPS coordinates (x2, y2) of the drone position and a predicted intersection area A between the user and the drone are mapped on an x-y plot. A distance D on the x-y plot indicates an actual distance between the position (x1, y1) of the user device and the position (x2, y2) of the drone. The actual distance D may be determined by calculations of the first data and the second data based on predetermined rules. The calculations can be performed by one or more of processors in the user device, the UTM system, cloud system, smart watch, etc.

In step 212, the distance D may be determined between the position of the user device and the position of the drone based on the first data and the second data.

In step 214, the determined distance D may be compared with a preset distance $D_p$ to determine whether it is equal to or less than a preset distance. The preset distance $D_p$ may be an adjustable parameter set by the user based on user's personal preferences and a comfort zone.

In step 216, instructions may be generated and provided to the user to direct the user to change the user path or the speed of travel for preventing the user from intersecting with, traveling beneath the drone or coming within a preset distance. This may be done when the determined distance D is equal to or less than the preset distance $D_p$. This may be done, for example, as described in connection with FIG. 3. The preset distance $D_p$ may have a default value. The instructions may by generated by the UTM system and updated on the application on the user device.

In some example embodiments, the process 200 may further comprise mapping the first data associated with the user location, the user path, the second data associated with the drone, and the drone route on a map shown on a graphic user interface of the user device.

In some example embodiments, the plurality of GPS data corresponding to the positions of the plurality of drones in an area may be filtered in accordance with the position of the user and as well as the preset distance set by or for the user and/or according to other predetermined rules. In some example embodiments, the UTM system generates the drone data and controls the drone data to be sent to the user device. In some example embodiments, filtering the drone data may be conducted by the UTM system and the UTM system may send the filtered data with the detected drone position and drone route information to the user device.

In some example embodiments, a drone speed may be detected based on the position of the drone and an update of the second data related to the movement of the drone or otherwise tracked by the UTM system. In some example embodiments, the intersection feature may not be necessary when the drone is far from the user location. However, it may be used to provide alerts in advance by providing a useful buffer distance between the drone and the user in a situation where the drone route is predicted to be close to or intersect with the user path. For example, the user may set up a five or ten foot buffer distance to receive an alert from the user device based on user's personal preferences and a comfort zone.

In some example embodiments, the altitude (e.g., drone flight height) of the drone and the altitude of the user device may be considered for calculating the distance D1 between the drone position and the user device. The user may also set a threshold height of the drone to receive an alert when a drone is flying near the user path. For example, the user may not be concerned with a drone flying 200 feet overhead, but wants to be alerted to drones flying less than 25 feet overhead. The set of GPS coordinates and altitude associated with the position of the drone may be mapped onto a plot of x, y, and z axes in the UTM system or user device for a three-dimensional (3D) visual mapping. In some example embodiments, a predictive visual cone (or area) may be generated in front of the drone. The predictive visual cone may include an intersection area with a particular altitude of the drone. The predictive visual cone may be generated based on the drone route, the drone speed, the user device location, the user path, etc. In some embodiments, the visual cone may be based on a drone forward velocity and a distance to ground (e.g., $D=\frac{1}{2} gt^2$, wherein t is time and g is the acceleration of gravity with a constant of 9.8 m/s$^2$).

Figure 4:
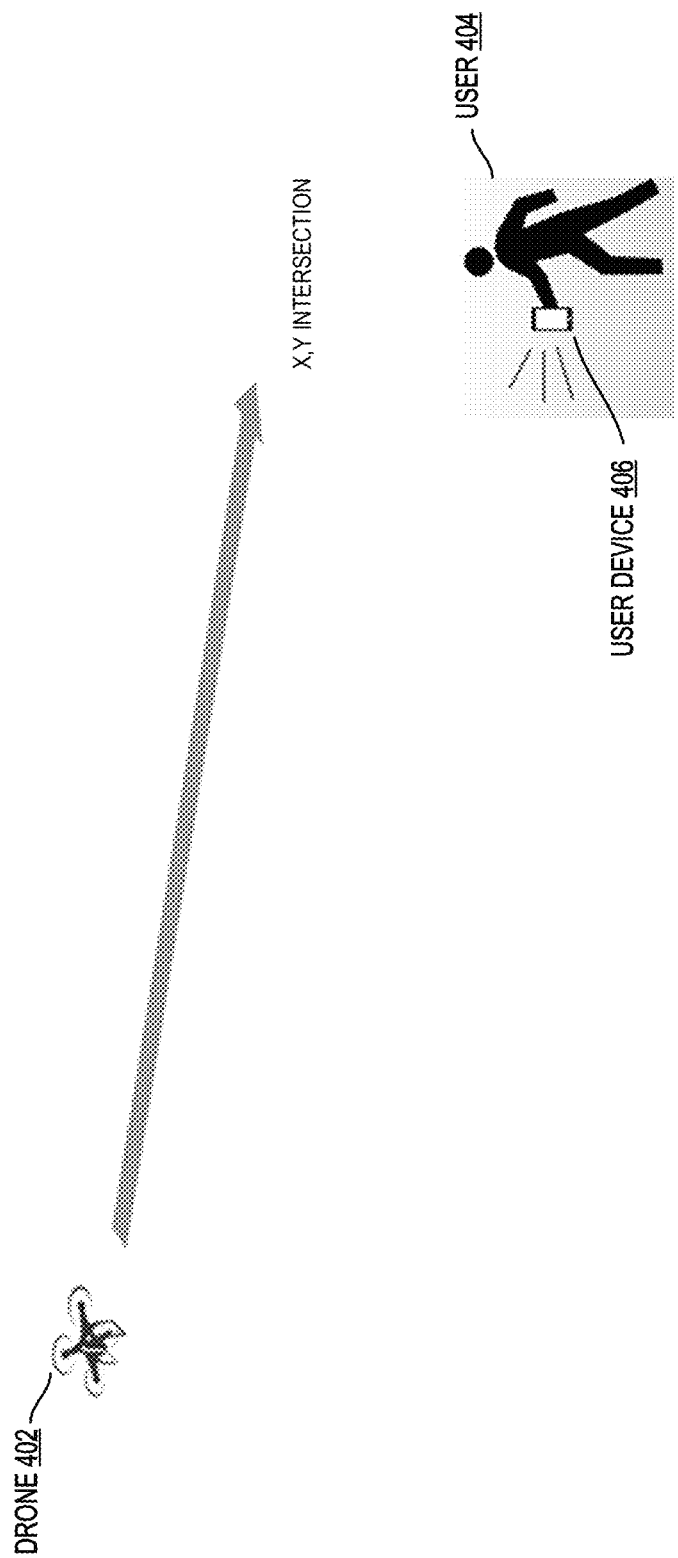
FIG. 4 is a diagram illustrating an example for a user device to send out an alert to prevent the user from traveling beneath the drone in accordance with some example embodiments.

FIG. 4 is a diagram illustrating an example system for a user device to issue an alert in accordance with some example embodiments. The alert may be generated and sent to a user 404 via the user mobile device 406. In some example embodiments, the alert from the user device may inform the user in general of nearby drones and provide information which the user may use to avoid the drone, for example, by changing walking direction or speed, such as walking left, slowing down, etc. The alert can be a simple audio sound and/or vibration on the device. The intensity of the alert may vary with the closeness of the drone to the user. For example, the user may hear a beep sound that indicates there may be a drone closing to the intersection area between the user path and the drone route. The user may check the detailed information or instructions indicated on the screen of the user device and walk faster, turn or stop until the sound goes away.

Figure 5:
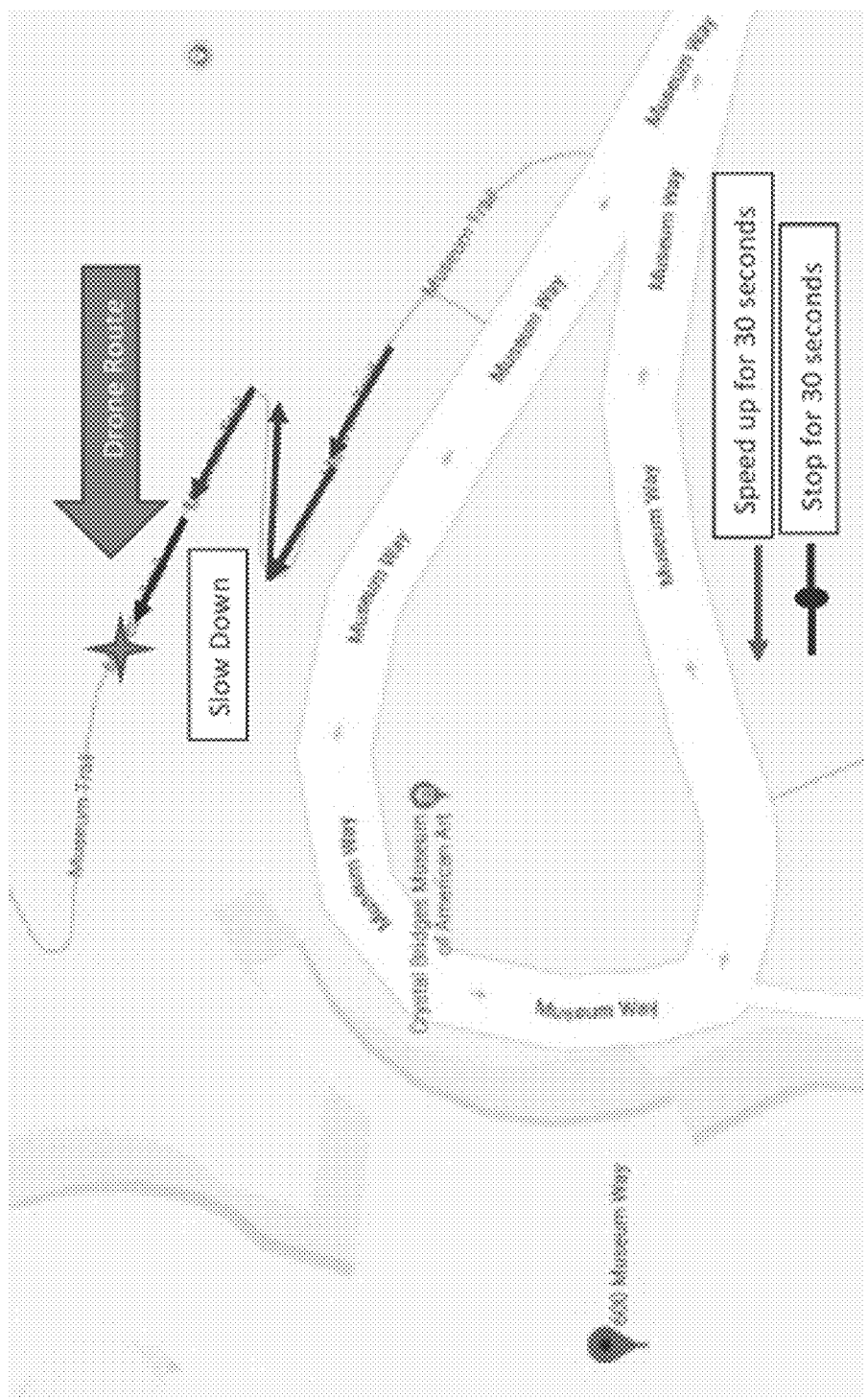
FIG. 5 is a diagram illustrating an example map screen for avoiding drone flying overhead in accordance with some example embodiments.

FIG. 5 is a diagram illustrating an example display notifying the user of a drone flying overhead and how to prevent the user from traveling beneath the drone in accordance with some example embodiments. As shown in FIG. 5, a flying drone is represented by a star on the map shown on the device. The drone route indicated on the map may show a direction of the drone with respect to the user path. The user path may be shown along a street or a sidewalk of the street. The drone's future route may also be shown on the map so that future intersections with the drone may be avoided.

In some example embodiments, the system may predict a route and a time that the drone is flying overhead based on the drone route, the drone speed, the user's travel speed and the user's travel direction. For example, a point or position of the future route of the drone may be shown, the next 100 feet or next 30 seconds of drone travel.

Figure 6:
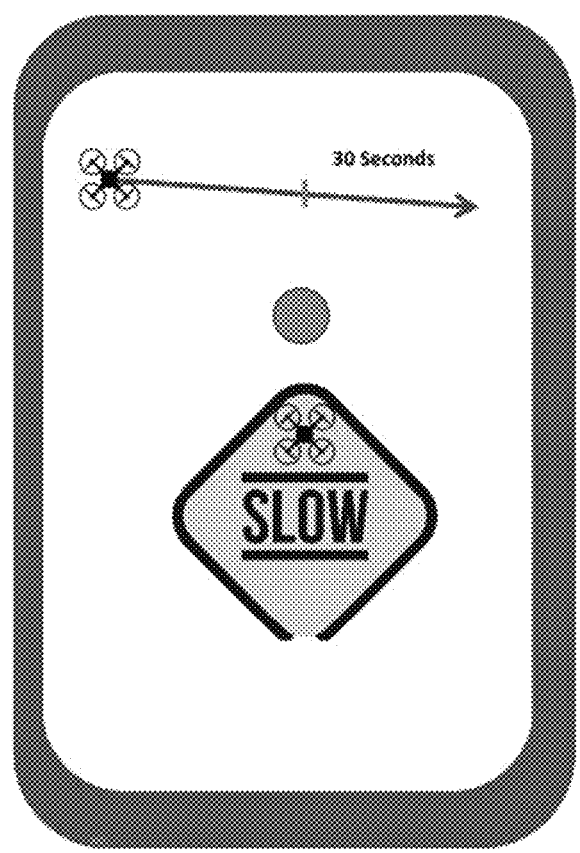
FIG. 6 is a diagram illustrating an example display screen for preventing the user from traveling beneath the drone flying overhead in accordance with some example embodiments.

As shown in FIG. 5, if the application determines that a particular drone may fly overhead of the user in the next 30 seconds based upon the drone route and the user's current path, the best likely course of action may be recommended for the user to avoid the drone, such as speed up for 30 seconds, slow down for 30 seconds or stop for 30 seconds. The course of action may be indicated as different lines and/or in different colors on the map. For example, FIG. 6 shows a diagram of a screen display on the user device with instructions for the user to slow down for 30 seconds for preventing the user from traveling beneath the drone flying overhead.

In some example embodiments, audible or vibration signals may be provided to alert the user. The signals may be detected during a phone call as per answering the call without the listener on the other end knowing. An intensity of the signals may vary with a closeness of the drone from the user location. A volume of the audible signal and a strength of the vibration signal may increase as the drone is flying closer such that the signals may vary to advise the user with a best course of action, such as speeding up, stopping or slowing down the pace of travel in order to avoid a direct overhead intersection. When receiving an alert of a nearby drone, the user may ignore an alert. In one example embodiment, the user may disable a setting of an alert in the application of the user device.

When the user has taken an action that prevents an intersection, the application may send out a signal to indicate that no further action is needed. The application on the user device may not reactivate unless either the user restarts an action that may lead to the intersection, the drone trajectory changes and sets a new intersection point, or a new drone approaches.

In some example embodiments, the system may generate instructions to direct the drone to change its route when the determined distance is equal to or less than the preset distance. The drone may avoid one or more users if it detects user location signals from the user devices via an image and sensor module. In addition, the drone may also receive instructions from the UTM system to avoid areas. The system may determine the drone's future flight path. Based on the user's path or predicted pattern, the system may predict the user and drone's paths may intersect with each other and issue an alert. For example, the system may determine that the user is on the way to a particular destination, based on time of day, prior trips, etc. The system may track a drone that may intersect the user's path and provide avoidance instructions, either to the user or the drone or both. For example, the drone may be able to adjust a flight direction or a flight speed along the flight route to deliver the cargo safely and at a safe location without impacting any other objects or users in the vicinity.

In some example embodiments, the system may be tuned so that it only detects drones that are behaving in a concerning way, for example, losing altitude, so the user is alerted with an instruction to take a proper action. The instruction may be an audible signal to advice the user to slow-down or speed up in order to prevent the user from traveling beneath the drone flying overhead.

In some example embodiments, the system may provide functions with augmented reality for indicating the drones nearby and providing alerts via the application on the user device. For example, the system may be used to track drones in response to a user's request. The user may hold up the user device to the sky so that drones on the UTM system are easy to spot based on the position of the user device mapping on a plot of x, y, and z axes. The drones may be shown as stars in the sky and/or be displayed on the user device screen. In some example embodiments, periphery devices, such as augmented glasses, may help in creating a visual identification of the drone so that the user may take whatever actions they might wish to. Actions taken are similar to what a user would do upon detecting an oncoming car. For example, the user may simply stop, move, change speed, change direction, or look up and watch so the intersection mapping on the x and y axes does not happen unexpectedly, or a problem can be observed before the drone makes a surprise harmful impact.

In some example embodiments, the application may be utilized in tracking of a delivery and providing live video of the drone flying in route and the associated drone delivery. For example, the UTM system or other traffic management system may trace drones, communicate with drones, and update the drone routes and package delivery status in the application. The user may view the drone routes and the package delivery status by accessing the application via the user device.

Figure 7:
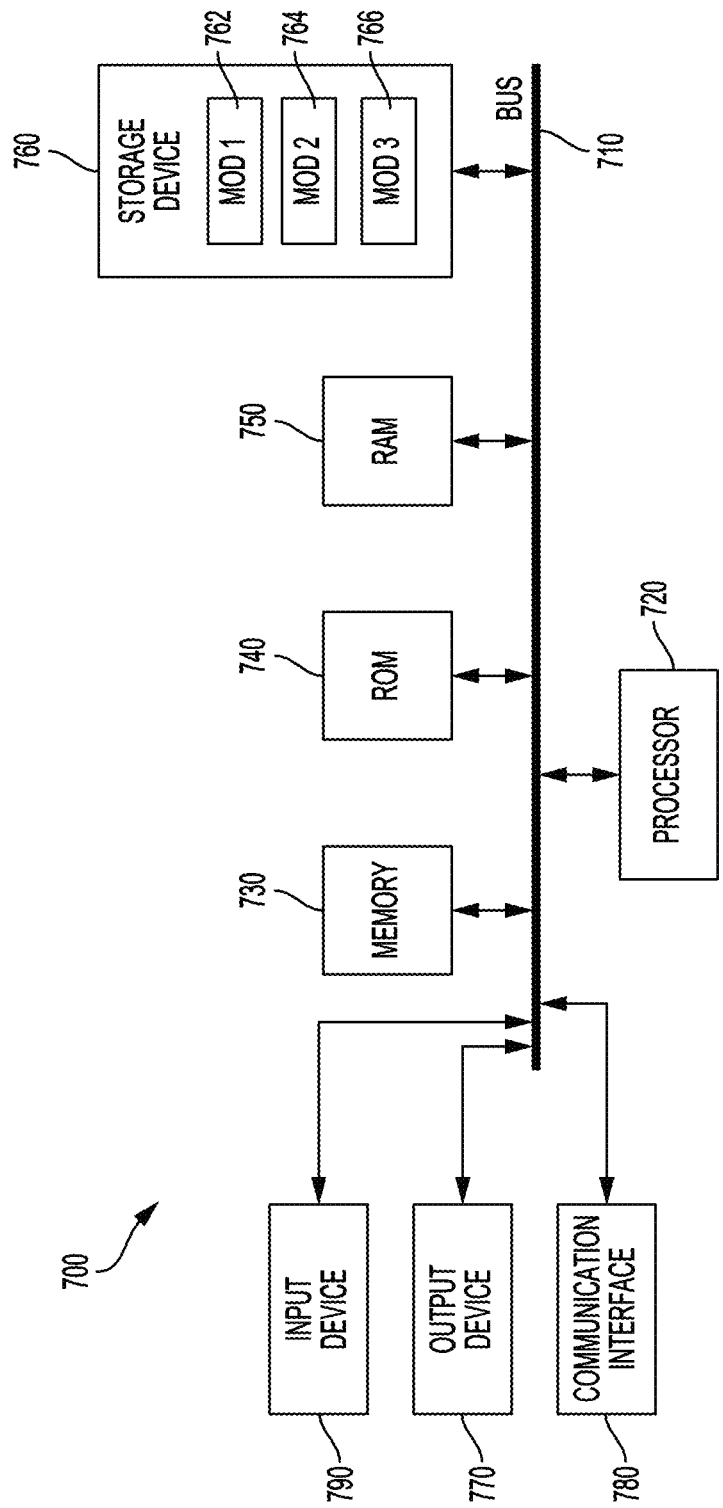
FIG. 7 is a block diagram of an example computer system in which some example embodiments may be implemented.

FIG. 7 illustrates an example computer device 700 which can be used to which may be used to implement embodiments as disclosed herein. The computing system 600 may be a server, a personal computer (PC), or another type of computing device. The example computing device 700 can include a processing unit (CPU or processor) 720 and a system bus 710 that couples various system components including the system memory 730 such as read only memory (ROM) 740 and random access memory (RAM) 750 to the processor 720. The computing device 700 can include a cache of high speed memory connected directly with, in close proximity to, or integrated as part of the processor 720. The computing device 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, bus 710, display 770, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 700 is a small, handheld computing device, a desktop computer, or a computer server.

Although the exemplary embodiment described herein employs the hard disk 760, other types of computer-readable media which can store data that are accessible by a computer, such as magnetic cassettes, flash memory cards, digital versatile disks, cartridges, random access memories (RAMs) 750, and read only memory (ROM) 740, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A computer-implemented method implemented on a user device carried by a user, the user device comprising at least one processor and at least one memory, the method comprising:

acquiring a first data associated with a position of the user device, the first data comprising a first latitude and a first longitude and being updated based on movement of the user device;

detecting a path corresponding to the movement of the user device;

receiving, from a server at the user device, drone data associated with a plurality of drones in an area where the user device is located;

filtering the drone data to obtain a second data associated with a position of a drone and a respective drone route which intersects with the path, the second data of the drone comprising a second latitude and a second longitude and being updated based on movement of the drone;

predicting an intersection area where the drone route intersects with the path, the intersection area having a center indicative of the position of the drone on a display screen of the user device and a circular area with a radius indicative of a preset distance between the drone and the user device;

determining a distance between the position of the user device and the position of the drone based on the first data and the second data;

determining whether a determined distance is equal to or less than a preset distance;

detecting user's travel speed, user's travel direction, and the path based on an update of the first data related to the movement of the user device;

predicting a drone route and a time that the drone flies overhead of the user based on operational parameters of the drone, the path, the user's travelling speed, and the user's travelling direction; and instructing, via a display screen of the user device, the user to change the path or a speed of travel down a path for preventing the user from traveling beneath the drone flying overhead when the determined distance is equal to or less than the preset distance.

2. The method of claim 1, further comprises:
mapping the first data and the path on a map shown on a display screen of the user device; and
mapping the second data and the drone route on the map shown on the display screen of the user device.

3. The method of claim 1, wherein the preset distance is an adjustable parameter set by the user based on user's personal preferences.

4. The method of claim 1, further comprises:
generating a predictive visual cone with an intersection area and an altitude of the drone; and
mapping the intersection area on the map on the display screen of the user device.

5. The method of claim 1, further comprises providing instructions to direct the drone to change the drone route for preventing from flying overhead of the user when the determined distance is equal to or less than the preset distance.

6. The method of claim 1, wherein instructing the user comprises providing an alert, and information shown on a map on the display screen; and wherein the information indicates the position of the drone, the drone route, the path, a suggested travel speed for the user, and a suggested travel direction for the user.

7. The method of claim 6, wherein the alert comprises a sound and a vibration; and an intensity of the alert vary with a closeness of the drone from the position of the user device, the intensity comprising a volume of the sound and a strength of the vibration.

8. A system comprising:
a server in communication with a plurality of drones;
a user device carried by a user and comprising at least one processor and a non-transitory computer-readable storage medium; and a non-transitory computer program product containing executable instructions, the non-transitory computer-readable storage medium having the instructions stored which, when executed by the processor, cause the processor to perform operations comprising:

acquiring a first data associated with a position of the user device, the first data comprising a first latitude and a first longitude and being updated based on movement of the user device;

detecting a path corresponding to the movement of the user device; receiving, from the server at the user device, drone data associated with a plurality of drones in an area where the user device is located;

filtering the drone data to obtain a second data associated with a position of a drone and a respective drone route which intersects with the path, the second data of the drone comprising a second latitude and a second longitude and being updated based on movement of the drone;

predicting an intersection area where the drone route intersects with the path, the intersection area having a center indicative of the position of the drone on a display screen of the user device and a circular area with a radius indicative of a preset distance between the drone and the user device;

determining a distance between the position of the user device and the position of the drone based on the first data and the second data;

determining whether a determined distance is equal to or less than a preset distance;

detecting user's travel speed, user's travel direction, and the path based on an update of the first data related to the movement of the user device;

predicting the drone route and a time that the drone flies overhead of the user based on operational parameters of the drone, the path, the user's travelling speed, and the user's travelling direction; and instructing, via a display screen of the user device, the user to change the path or a speed of travel down a path for preventing the user from traveling beneath the drone flying overhead when the determined distance is equal to or less than the preset distance.

9. The system of claim 8, wherein the operations further comprise:
mapping the first data and the path on a map shown on a display screen of the user device; and
mapping the second data and the drone route on the map shown on the display screen of the user device.

10. The system of claim 8, wherein the preset distance is an adjustable parameter set by the user based on user's personal preferences.

11. The system of claim 8, wherein the operations further comprise:
generating a predictive visual cone with an intersection area and an altitude of the drone; and
mapping the intersection area on the map on the display screen of the user device.

12. The system of claim 8, further comprises generating instructions to direct the drone to change the drone route for preventing from flying overhead of the user when the determined distance is equal to or less than the preset distance.

13. The system of claim 8, wherein the instructions comprise an alert, and information shown on a map on the display screen; and wherein the information indicates the position of the drone, the drone route, the path, a suggested travel speed for the user and a suggested travel direction for the user.

14. The system of claim 13, wherein instructing the user comprises providing the alert comprises a sound and a vibration; and an intensity of the alert vary with a closeness of the drone from the position of the user device, the intensity comprising a volume of the sound and a strength of the vibration.

15. A non-transitory computer-readable storage medium having instructions stored which, when executed by a processor associated with a user device carried by a user, cause the processor to perform operations comprising:
    acquiring a first data associated with a position of the user device, the first data comprising a first latitude and a first longitude and being updated based on movement of the user device;
    detecting a path corresponding to the movement of the user device;
    receiving, from a server at the user device, drone data associated with a plurality of drones in an area where the user device is located;
    filtering the drone data to obtain a second data associated with a position of a drone and a respective drone route which intersects with the path, the second data of the drone comprising a second latitude and a second longitude and being updated based on movement of the drone;
    predicting an intersection area where the drone route intersects with the path, the intersection area having a center indicative of the position of the drone on a display screen of the user device and a circular area with a radius indicative of a preset distance between the drone and the user device;
    determining a distance between the position of the user device and the position of the drone based on the first data and the second data;
    determining whether a determined distance is equal to or less than a preset distance;
    detecting user's travel speed, user's travel direction, and the path based on an update of the first data related to the movement of the user device;
    predicting the drone route and a time that the drone flies overhead of the user based on operational parameters of the drone, the path, the user's travelling speed, and the user's travelling direction; and
    instructing, via a display screen of the user device, the user to change the path or a speed of travel down a path for preventing the user from traveling beneath the drone flying overhead when the determined distance is equal to or less than the preset distance.

16. The non-transitory computer-readable storage medium of claim 15, wherein the operations further comprise:
    mapping the first data and the path on a map shown on a display screen of the user device; and
    mapping the second data and the drone route on the map shown on the display screen of the user device.

* * * * *